United States Patent [19]

Sowa

[11] Patent Number: 4,536,656
[45] Date of Patent: Aug. 20, 1985

[54] PHOSPHOR INDICATION DEVICE
[75] Inventor: Kunihiro Sowa, Okazaki, Japan
[73] Assignee: Nippon Soken, Inc., Nishio, Japan
[21] Appl. No.: 472,990
[22] Filed: Mar. 7, 1983
[30] Foreign Application Priority Data Apr. 2, 1982 [JP] Japan .................................. 57-55703

[51] Int. Cl.³ ............................................. G09F 13/20
[52] U.S. Cl. ............................... 250/463.1; 250/462.1; 40/543; 362/84
[58] Field of Search .......................... 250/463.1, 462.1; 40/543; 362/84

[56] References Cited

U.S. PATENT DOCUMENTS 3,105,954 10/1963 Gill .............................. 250/462.1 X

FOREIGN PATENT DOCUMENTS 653672 5/1951 United Kingdom ............. 250/463.1

Primary Examiner—Alfred E. Smith
Assistant Examiner—Jack I. Berman
Attorney, Agent, or Firm—Cushman, Darby & Cushman

[57] ABSTRACT

A phosphor indication device suitable for use as a meter of a vehicle including an indication section having a pattern and characters to be indicated which are printed with at least one ordinary paint and at least one paint containing a phosphor differing in color when it is exposed to light capable of exciting the phosphor to emit light in fluorescence from when it is exposed to ordinary light unable to excite the phosphor to emit light. The pattern and characters of the indication section may be illuminated by a light source capable of exciting the phosphor to emit light in fluorescence and at least one light source emitting ordinary light, so that the colors of the pattern and characters can be varied when they are illuminated by light capable of exciting the phosphor to emit light in fluorescence from when they are exposed to ordinary light to enable indication to be given in a characteristic fashion.

8 Claims, 8 Drawing Figures

PHOSPHOR INDICATION DEVICE

FIELD OF THE INVENTION

This invention relates to a phosphor indication device suitable for use as a meter carried by a vehicle, for example.

DESCRIPTION OF THE PRIOR ART

Figure 1A:
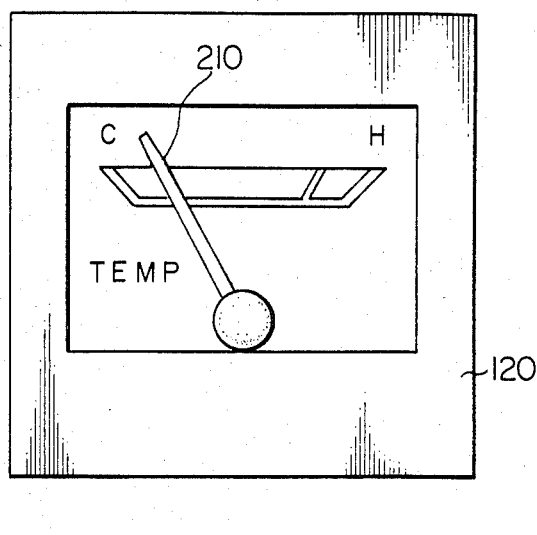
FIGS. 1a and 1b are a front view and a sectional view, respectively, of a phosphor indication device of the prior art, showing its construction.
Figure 1B:
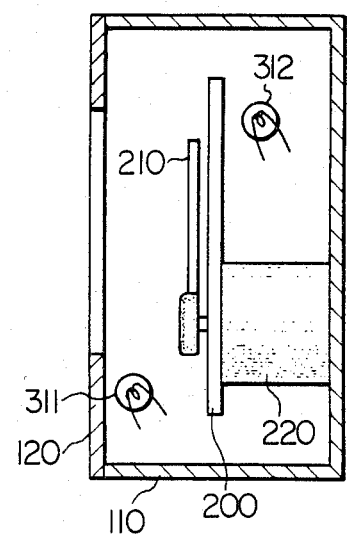

FIGS. 1a and 1b show a phosphor indication device of the prior art functioning as a meter for a motor vehicle, which may be a heat indicator, in which irradiation is carried out by small incandescent lamps from the front or the rear of an indication panel. In the figures, the phosphor indication device is contained in a casing 110 and includes a masking panel 120 for covering other sections than an indication section. The phosphor indication device further comprises an indication panel 200, a pointer 210, a drive 220 for the pointer 210 and incandescent lamps 311 and 312 for performing irradiation.

In the phosphor indication device of the aforesaid construction of the prior art, difficulties have hitherto been experienced, when the device is of the type in which irradiation is carried out from the front, in indicating certain portions of the indication section at night or in dark places in colors different from the colors in which indication is given in the daytime, because the colors in which indication is given are affected by the colors of the lights used for carrying out irradiation. When the device is of the type in which irradiation is performed from the rear, it is possible to vary the colors in which indication is given in the daytime and at night or in dark places by mounting between a pattern to be indicated and the panel a color filter prepared as by printing. However, some disadvantages are associated with this type of device. If the pattern to be indicated is highly permeable to light, it would be open to passage of light rays of the colors of the filter, thereby influencing the colors in which indication is given in the daytime. Thus it would be impossible to improve the light-permeability of the pattern to be indicated and difficulties would be faced with in giving indication in bright colors at night or in dark places. Also, the use of the color filter would make it impossible to use any color as desired when the pattern is printed with paints.

SUMMARY OF THE INVENTION

This invention has been developed for the purpose of obviating the aforesaid disadvantages of the prior art. Accordingly the invention has as its object the provision of a phosphor indication device enabling indication of a pattern and characters in the indication section to be given in different colors when they are exposed to phosphor exciting light rays and when they are exposed to ordinary light rays.

To accomplish the aforesaid object, the pattern and characters in the indication section are printed according to the invention by using at least one ordinary paint unable to fluoresce (hereinafter a paint), and at least one paint containing a phosphor (hereinafter a phosphor containing paint) differing in color when exposed to light able to excite the phosphor to emit light and when exposed to ordinary light rays which do not excite the phosphor to emit light (hereinafter ordinary light) so that the color in which the indication section is indicated can be varied when it is exposed to light rays capable of exciting the phosphor to emit light (hereinafter exciting light) and when it is exposed to ordinary light so that the color in which the indication section is indicated may be varied depending on the type of light to which it is exposed.

Additional and other objects, features and advantages of the invention will become apparent from the description set forth hereinafter when considered in conjunction with the accompanying drawings.

DESCRIPTION OF THE PREFERRED EMBODIMENTS

Figure 2A:
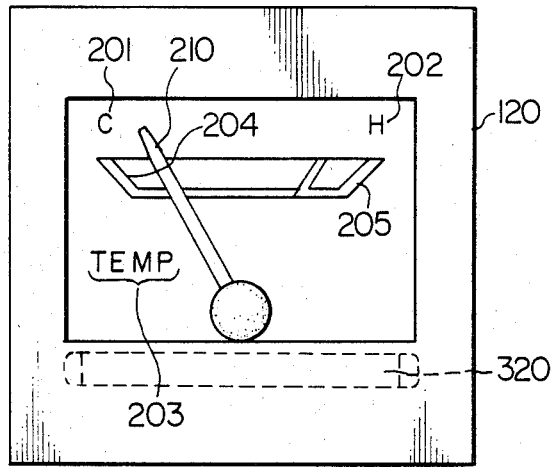
FIGS. 2a and 2b are a front view and a sectional view, respectively, of the phosphor indication device according to one embodiment of the invention.
Figure 2B:
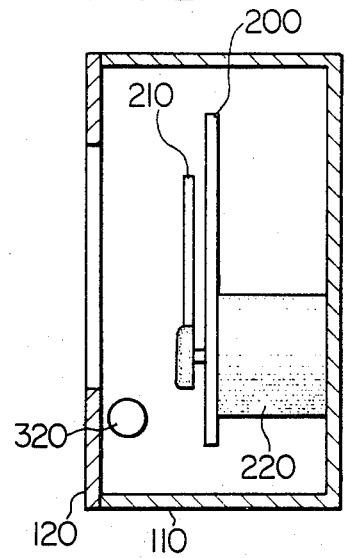

The invention will now be described in detail by referring to the preferred embodiments shown in the accompanying drawings. FIGS. 2a and 2b show a first embodiment of the phosphor indication device according to the invention being applied to an indication section of a heat indicator of a vehicle. In the embodiment shown, characters 201 to 203 and a graduation 204 that have hitherto been printed with a white paint in the prior art are now printed with a phosphor containing paint containing $Zn_2SiO_4:Mn$, for example, which is white in color when exposed to white ordinary light (hereinafter white light) but emits green light when irradiated with ultraviolet rays. A graduation 205 that has hitherto been printed with a paint of orange color is printed with a phosphor containing paint containing $(Sr, Mg, Ba)_3(PO_4)_2:Sn$, for example, which is white in color when exposed to white light but emits orange light when irradiated with ultraviolet rays. A pointer 210 is printed with a phosphor containing paint containing $Y_2O_3:Eu$, for example, which is white in color when exposed to white light but emits red light when irradiated with ultraviolet rays. The numeral 320 designates a ultraviolet lamp which is a low-temperature mercury lamp contained in a casing formed of glass capable of effectively emitting ultraviolet rays of a wavelength of 253.7 n m as the mercury vapor discharged. The ultraviolet lamp 320 is arranged in front of an indication panel 200 so as to effectively irradiate the panel 200 and is masked by a masking panel 120 to obstruct a direct view from the observer. Portions of the indication panel 200 other than the characters 201 to 203 and the graduations 204 and 205 are painted in a dark color to provide a background to the characters and graduations, as has hitherto been the case.

In the first embodiment shown and described hereinabove, the indication section of the heat indicator of the aforesaid construction is exposed to light from outside when the ultraviolet lamp 320 is not lit in the daytime, so that the characters 201 to 203, graduations 204 and 205 and pointer 210 are white in color to the viewer's eye. Meanwhile when light from outside is not enough to illuminate the indication section, such as at night, the characters 201 to 203 and graduation 204 fluoresce in a green color, the graduation 205 fluoresces in an orange color and the pointer 210 fluoresces in a red color if the ultraviolet lamp 320 is lit, thereby enabling effective indication to be given.

Figure 3A:
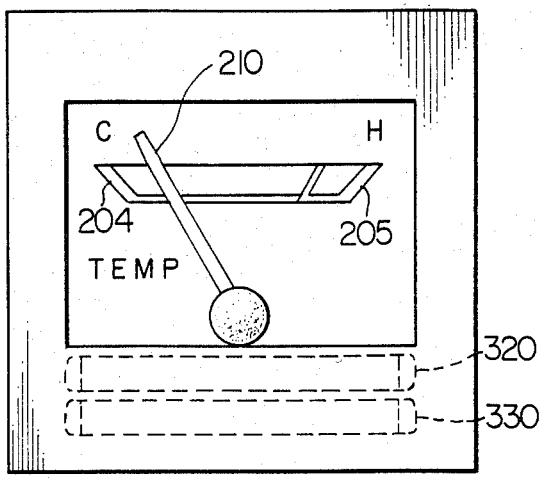
FIGS. 3a and 3b are a front view and a sectional view, respectively, of the phosphor indication device according to another embodiment.
Figure 3B:
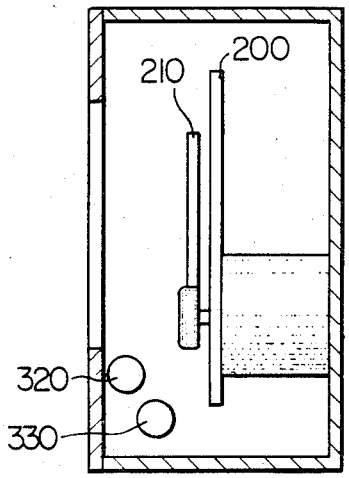

FIGS. 3a and 3b show a second embodiment which is distinct from the first embodiment described by referring to FIGS. 2a and 2b in that whereas in the first embodiment there is provided only the ultraviolet lamp 320 for illuminating the indication panel 200, a lamp 330 emitting white light or colored ordinary light is used in addition to the ultraviolet lamp 320 in the second embodiment so that one of the two lamps can be selectively lit. As described by referring to the first embodiment, the phosphor containing paint used for printing the characters, for example, is white in color when exposed to white light. Thus when irradiated with the lamp 330 emitting ordinary light, the charactaers appear in a color that reflects the color of the lamp. In the second embodiment, it is possible to provide an indication in fluorescence when the ultraviolet lamp 320 is lit while an indication can be obtained in a color reflecting the color of the light emitted by the lamp 330 when it is lit by selectively lighting one of the two lamps 320 and 330. The device shown in FIGS. 3a and 3b may be constructed such that the characters and other parts of the indication section of the heat indicator are printed with a phosphor containing paint which is white in color when exposed to white light but fluorescence in red, and the ultraviolet lamp 320 and the green fluorescent lamp 330 are used as sources of irradiation so that the green fluorescent lamp 330 will be lit when the water temperature is normal and the ultraviolet lamp 320 will be lit when the water temperature rises to an inordinately high level. By this arrangement, it is possible to provide an indication section for the heat indicator which is capable of showing the characters in a green color when the condition is normal but changing the color of the characters to red when the condition becomes abnormal, thereby enabling the existence of an abnormal condition to be clearly indicated.

Figure 4A:
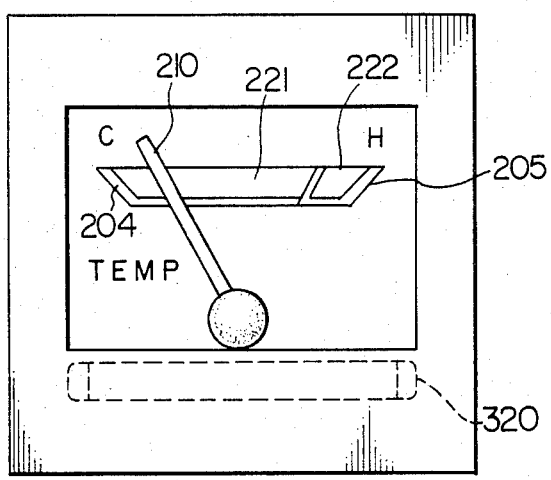
FIGS. 4a and 4b are a front view and a sectional view, respectively, of the phosphor indication device according to still another embodiment.
Figure 4B:
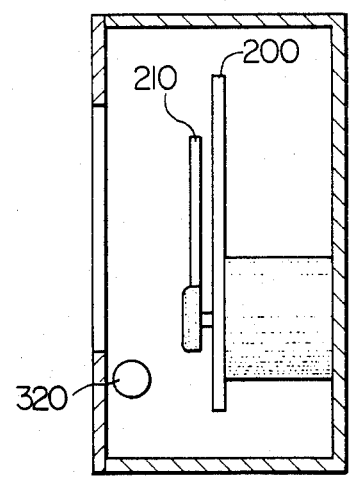

FIGS. 4a and 4b show a third embodiment which is characterized in that portions of the indication panel 200 close to portions printed with a phosphor containing paint are painted with ordinary paints. In FIGS. 4a and 4b, the numerals 221 and 222 designate zones printed with ordinary paints. As described by referring to the first embodiment, it is possible to indicate different zones by printing the graduations 204 and 205 with different phosphor containing paints containing phosphors emitting different colors when the ultraviolet lamp 320 is used for purposes of irradiation. However, they are of the same color when exposed to ordinary light, making it impossible to readily distinguish between the two zones. The third embodiment eliminates the aforesaid disadvantage of the first embodiment and has the feature that by using paints of different colors for printing different zones, it is possible to clearly distinguish one zone from the other by the colors of the paints used when exposed to ordinary light. Also, by using paints of colors which are substantially similar to the colors emitted by phosphors, it is possible to give the same impression to the viewer both when the indication section is irradiated with ultraviolet rays and when exposed to ordinary light.

From the foregoing description, it will be appreciated that in the phosphor indication device according to the invention, the pattern and characters of an indication section are printed with phosphor containing paints containing phosphors emitting light of colors different from the colors of the paints under ordinary light, and the indication section can be illuminated by a light source capable of exciting the phosphors to emit light. Thus the invention can achieve the effect of enabling the pattern and characters of the indication section to be indicated in different colors when exposed to ordinary light and when exposed to the phosphor exciting light source.

In the embodiments shown and described hereinabove, the invention has been described as being incorporated in a heat indicator. It is to be understood, however, that the invention is not limited to the specific form of the embodiments shown and described hereinabove and that it can have application in other indication devices, such as a speedometer, a safety indicator, etc., without departing from the scope of the invention.

The invention is not limited to the specific phosphors described by referring to the embodiments, and and fluorescent material may be used as desired so long as it is capable of emitting light when excited by a suitable light source. Any phosphorescent paint that appears colored when exposed to white light may, of course, be used.

The light source for exciting a phosphor to emit light is not limited to the ultraviolet lamp, and any light source may be used as desired so long as a phosphor can be excited thereby to emit light.

The lamp 330 described by referring to the second embodiment as emitting white ordinary light or colored ordinary light is not limited to one type. A plurality of lamps, such as those emitting white light, green light and yellow light, may be used to enable one or a plurality of lamps to be selectively lit to carry out illumination of the indication panel.

What is claimed is:

1. A phosphor indication device of a meter comprising:
   an indication section formed on an indicator panel and showing a pattern and characters printed on it with a phosphor-containing paint; and
   a light source for irradiating the phosphor-containing paint to excite a phosphor to emit light to thereby indicate the pattern and characters in fluorescence;
   the indicator panel and light source are accommodated in a meter casing;
   wherein the pattern and characters on the indicator panel are of at least one phosphor-containing paint which differs in color when it is exposed to light capable of exciting the phosphor to emit light from when it is exposed to ordinary light unable to excite the phosphor to emit light.

2. A phosphor indication device of a meter as claimed in claim 1, wherein said pattern and characters are printed with a plurality of phosphor-containing paints which are substantially the same color when exposed to light unable to excite phosphors but emit light of different colors in fluorescence when exposed to light capable of exciting the phosphor.

3. A phosphor indication device of a meter comprising:
   an indication section formed on an indicator panel and showing a pattern and characters printed on it with a phosphor-containing paint;
   a light source for irradiating the phosphor-containing paint to excite a phosphor to emit light to thereby indicate the pattern and characters in fluorescence;

the indicator panel and light source are accommodated in a meter casing;

wherein the pattern and characters on the indicator panel are of at least one phosphor-containing paint which differs in color when exposed to light capable of exciting the phosphor to emit light from when it is exposed to ordinary light unable to excite the phosphor to emit light; and at least one additional light source unable to excite the phosphor to emit light whereby the light sources can be actuated singly or in combination.

4. A phosphor indication device of a meter comprising:

an indication section formed on an indicator panel and showing a pattern and characters printed on it with a phosphor-containing paint;

a light source for irradiating the phosphor-containing paint to excite a phosphor to emit light to thereby indicate the pattern and characters in fluorescence;

the indicator panel and light sources are accommodated in a meter casing;

wherein the pattern and the characters on the indicator panel are of (1) at least one phosphor-containing paint which differs in color when it is exposed to light capable of exciting the phosphor to emit light from when it is exposed to ordinary light unable to excite the phosphor to emit light and (2) ordinary non-fluorescent paints for printing portions adjacent the indication section printed with the phosphor-containing paint.

5. A phosphor indication device of a meter as claimed in claim 4, wherein said non-fluorescent paints have colors which are substantially the same as the colors of light emitted by the phosphor excited by the light source.

6. A phosphor indication device of a meter as claimed in claim 1, wherein a masking panel covers sections in addition to an indication section on the front side of the casing, and said light source is arranged in a position which is a front surface of said indicator panel and covered by said masking panel.

7. A phosphor indication device of a meter as claimed in claim 1, further including a pointer which is printed with a phosphor-containing paint which differs in color when it is exposed to light capable of exciting the phosphor to emit light from when it is exposed to ordinary light unable to excite the phosphor to emit light.

8. A phosphor indication device of a meter as claimed in claim 1, wherein said indication includes graduations which are printed with a plurality of phosphor-containing paints which are substantially the same color when exposed to light unable to excite phosphors but emit light of different colors upon fluorescence, and the portions adjacent said graduations on said indicator panel are printed with original paint which is substantially the same color as the fluorescence color on each graduation according to the adjacent graduation zones.

* * * * *